(12) United States Patent
Jenks et al.

(10) Patent No.: US 9,053,480 B1
(45) Date of Patent: Jun. 9, 2015

(54) SECURE VALIDATION USING HARDWARE SECURITY MODULES

(75) Inventors: Jason Jenks, Lynnwood, WA (US); Brandon B. Low, Seattle, WA (US); Hanson Char, Mercer Island, WA (US); Peter S. Vosshall, Bainbridge Island, WA (US); Waylon Brunette, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 52 days.

(21) Appl. No.: 12/242,732

(22) Filed: Sep. 30, 2008

(51) Int. Cl.
  *G06Q 20/00* (2012.01)
  *G06Q 20/38* (2012.01)

(52) U.S. Cl.
  CPC .................................. *G06Q 20/382* (2013.01)

(58) Field of Classification Search
  USPC .......................................................... 705/64
  See application file for complete search history.

(56) References Cited

U.S. PATENT DOCUMENTS

| | | | |
|---|---|---|---|
| 6,073,160 A * | 6/2000 | Grantham et al. ............ | 709/200 |
| 2003/0217258 A1 * | 11/2003 | Bade ............................. | 713/150 |
| 2004/0039925 A1 | 2/2004 | McMillan et al. | |
| 2004/0091116 A1 * | 5/2004 | Staddon et al. ............... | 380/277 |
| 2004/0128247 A1 | 7/2004 | Sato et al. | |
| 2006/0072762 A1 | 4/2006 | Buer | |
| 2006/0136717 A1 | 6/2006 | Buer et al. | |
| 2007/0162766 A1 | 7/2007 | Watanabe | |
| 2008/0005017 A1 * | 1/2008 | Poster ............................. | 705/39 |
| 2008/0046982 A1 | 2/2008 | Parkinson | |
| 2008/0091944 A1 | 4/2008 | von Mueller et al. | |
| 2009/0300744 A1 | 12/2009 | Guo et al. | |

FOREIGN PATENT DOCUMENTS

WO    WO2007/034184 A2    3/2007

OTHER PUBLICATIONS

Wikipedia—Bloom filter. Last updated Apr. 8, 2010. Retrieved online Apr. 20, 2010.*
Non-Final Office Action for U.S. Appl. No. 12/242,746, mailed on Sep. 16, 2011, Jason Jenks, "Hardening Tokenization Security and Key Rotation", 16 pages.
Final Office Action for U.S. Appl. No. 12/242,746, mailed on Nov. 8, 2013, Jason Jenks, "Hardening Tokenization Security and Key Rotation", 18 pages.
Final Office Action for U.S. Appl. No. 12/242,746, mailed on Apr. 16, 2012, Jason Jenks et al., "Hardening Tokenization Security and Key Rotation", 19 pages.
Mehuron, "Security Requirements for Cryptographic Modules", Information Technology Laboratory National Institute of Standards and Technology, Supercedes FIPS Pub 140-2, 2001, 69 pages.
Yang et al., "Improving Memory Encryption Performance in Secure Processors", IEEE Transactions on Computers, vol. 53, No. 5, 2005, 11 pages.

* cited by examiner

*Primary Examiner* — James A Reagan
(74) *Attorney, Agent, or Firm* — Davis Wright Tremaine LLP

(57) ABSTRACT

Disclosed is secure decryption and business rule validation of encrypted confidential data within a hardware security module (HSM). The validation may include the use of a Bloom filter stored and executing within the HSM. The return order of encrypted data within the HSM as well as requests for external data relating to validation may be randomized to further harden against correlation attacks.

20 Claims, 4 Drawing Sheets

SECURE VALIDATION USING HARDWARE SECURITY MODULES

BACKGROUND

Organizations find it necessary to validate data, including payment or identification information. Data validation is the process of ensuring that data to be processed is correct, free of unnecessary or unwanted data, and typically involves testing against a list of valid items or algorithms.

Validation can be computationally intensive, create unwanted delays, and render confidential information more accessible to compromise. Confidential information may be more accessible to compromise because conventional data validation systems render encrypted confidential information into cleartext for validation within applications that may be subject to compromise.

Given the costs involved with breaches of security, organizations demand hardened and more secure validation of data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As described above, data validation requires computational resources as well as presenting the data in a form which can be validated, typically into cleartext. Validation of alphanumeric data against business rules encompasses a variety of uses from checking personal identification information (e.g., pin numbers, social security numbers, login names, passwords, etc.), access information (e.g. access codes, access control lists, etc.), payment information (e.g., credit card numbers, bank account numbers, loan numbers, etc.), or otherwise confirming that information input is complete and correct.

This disclosure describes a variety of techniques for using a hardware security module (HSM) to provide rapid and secure validation of encrypted information. By decrypting confidential information within a hardened HSM, the cleartext for validation is shielded from attacks on the host server operating system or applications.

An attacker could attempt to compromise the processing of data within an HSM by monitoring the input and output of the HSM and attempting to find an association between the inputs and the outputs. This may be termed a "correlation attack." To harden against this form of attack, randomization of the return order or processing order of data within the HSM or the requests for validation data external to the HSM necessary to complete validation processes, or both, may take place. This randomization thus obscures the association between specific inputs and outputs to the HSM.

Furthermore, utilizing an HSM in a validation server improves availability of cryptographic functions necessary to render cleartext for validation processing. This improved availability may reduce time for validation, which can be beneficial in a high-transaction environment.

Illustrative System Architecture

Figure 1:
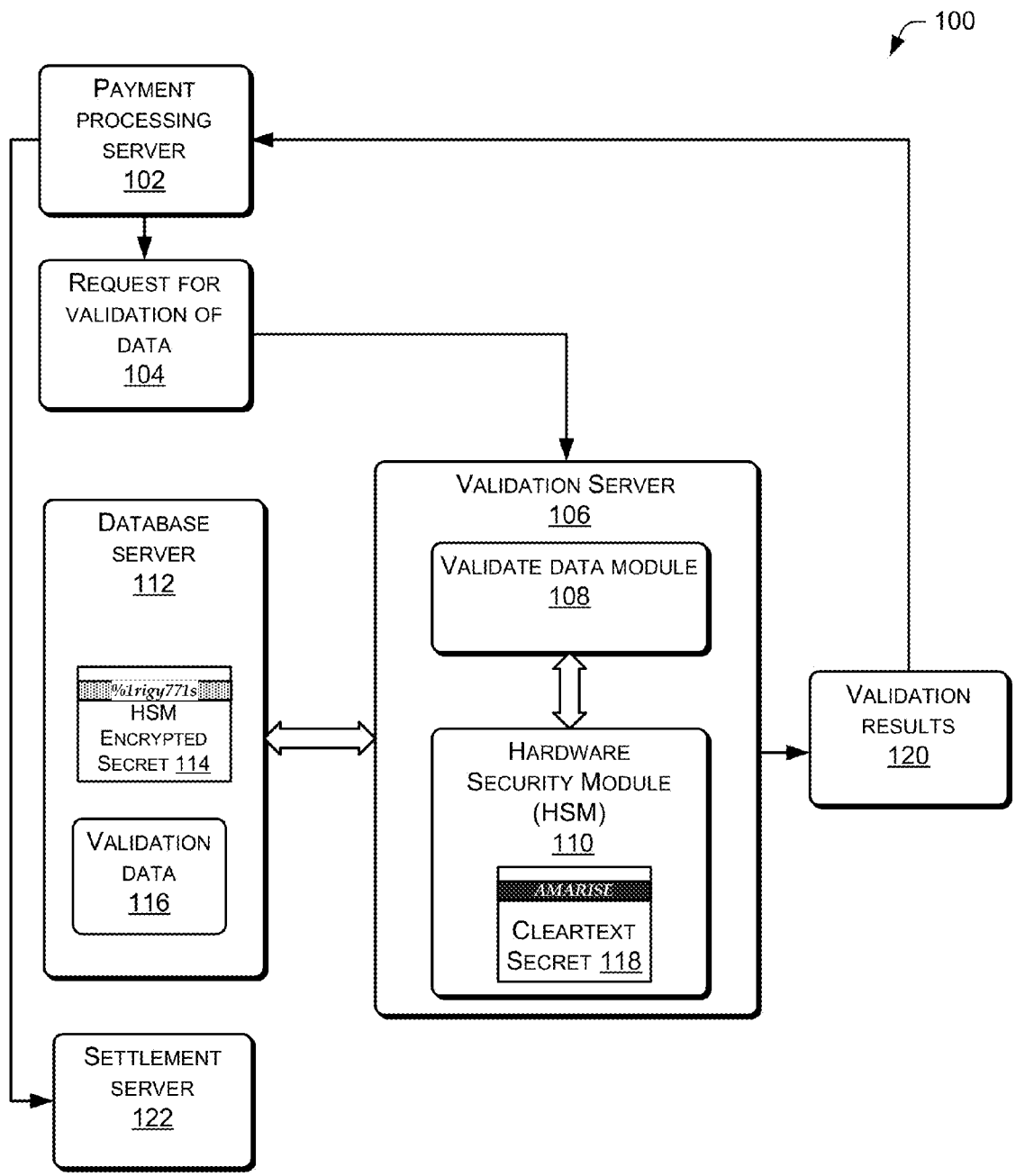
FIG. 1 is an illustrative schematic diagram of an illustrative payment processing server requesting validation from a validation server including a hardware security module (HSM).

FIG. 1 is an illustrative schematic diagram 100 of an illustrative payment processing server requesting validation from a validation server. In high transaction environments, the payment processing and validation functions may be separated to increase performance and scalability.

A payment processing server 102 has data to be validated. This data may be personal identification information, security access information, account information, payment information or the like. For example, the data may be credit card account or bank account numbers.

The payment processing server 102 makes a request for validation of data 104 against business rules. The payment processing server 102 requests validation of the data 104 for business reasons so it may properly complete the payment processing resulting in settlement of funds and shipment of goods. While shown as being external to the validation server 106, payment processing server 102 may be within validation server 106. If external, the request from payment processing server 102 may reach the validation server by a network including any one or combination of multiple different types of networks, such as cable networks, the Internet, wired, wireless, other local or wide area networks, as well as a physical exchange of data stored on memory. If internal, the request from payment processing server 102 may be by a program call or otherwise along a system bus.

Validation server 106 receives the request for validation of data 104. The validation server 106 may encompass a system ranging from a single server at one geographic location to an array of many servers spread across the world.

A validate data module 108 accepts the request for validation and accesses the HSM 110. The validate data module may access the capabilities of the HSM 110 by way of an adjunct application programming interface (API).

An application programming interface (API) is a set of functions, procedures or classes that an operating system, library or service provides to support requests made by computer programs stored in memory and executing on a processor. Here, the adjunct API provides the programs executing on the validation server with callable hooks to easily utilize the features available within the HSM. The HSM may also have an internal API, which may be called by the adjunct API.

HSM 110 receives the request for validation from payment processing server 102. The HSM 110 may be implemented as a plug-in card within a host computer system or as a physically external device (such as one connected via Universal Serial Bus (USB), Small Computer System Interface (SCSI), fibre channel, Ethernet, and the like). A HSM may include a tamper resistant physical package, a general purpose processor executing cryptographic functions or processor optimized for cryptographic operations. An HSM may have dedicated memory onboard, provide secure storage of keys, and have functionality for code signing to enforce access control lists (ACL). The HSM provides a hardened environment for cryptographic operations. Among others, one suitable HSM is the nShield™ device from nCipher™ Corporation Ltd of Cambridge, United Kingdom and the Luna® device from SafeNet® Inc. of Belcamp, Md., United States.

A database server 112 storing information for use by the validation server is shown. The database server 112 contains one or more processors and memory. While shown as being external to the validation server 106, the database server 112 may be within the validation server.

An HSM-encrypted secret 114, for example a credit card number, is stored in the database server memory in ciphertext. In this example, the ciphertext string is "% 1rigy771s." Validation data 116 is also stored in the database server memory. The validation data may include valid Bank Identification Number (BIN) ranges, comparison strings, hash algorithms, checksums algorithms and the like. Validation data may be stored encrypted, in plaintext, or a combination.

HSM 110 decrypts the HSM-encrypted secret 114 to produce a cleartext version of the secret (a "cleartext secret") 118 within the HSM 110 for validation. In this example, the cleartext secret is represented by the string "AMARISE". HSM 110 outputs validation results to validation server 106 and returns the validation results 120 to payment processing server 102.

Payment processing server 102 may now transmit validated data to the settlement server 122 for settlement of funds. The settlement server may be within the organization, or be part of another organization such as a credit card company, bank, intermediate settlement processing agency, and the like. Use of a validation server 106 prior to transmittal to the settlement server 122 offers several advantages. It is common for settlement servers to charge transaction fees for each piece of payment information for which settlement or validation is attempted. For example, a credit card company may charge for every card number submitted for settlement, regardless of whether the card number is valid. By validating data prior to transmittal, an organization can avoid transactional fees for attempting to validate otherwise invalid data. Additionally, validation prior to transmittal to a settlement server can increase processing speed of payment information, allowing a faster experience to end users of the organization.

All of the computer systems described herein including payment processing server 102, the validation server 106, the HSM 110, and database server 112 may contain one or more processors as well as memory including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other computer readable storage medium which can be used to store the desired information and which can be accessed by one or more processors.

Illustrative Validate Data Module

Figure 2:
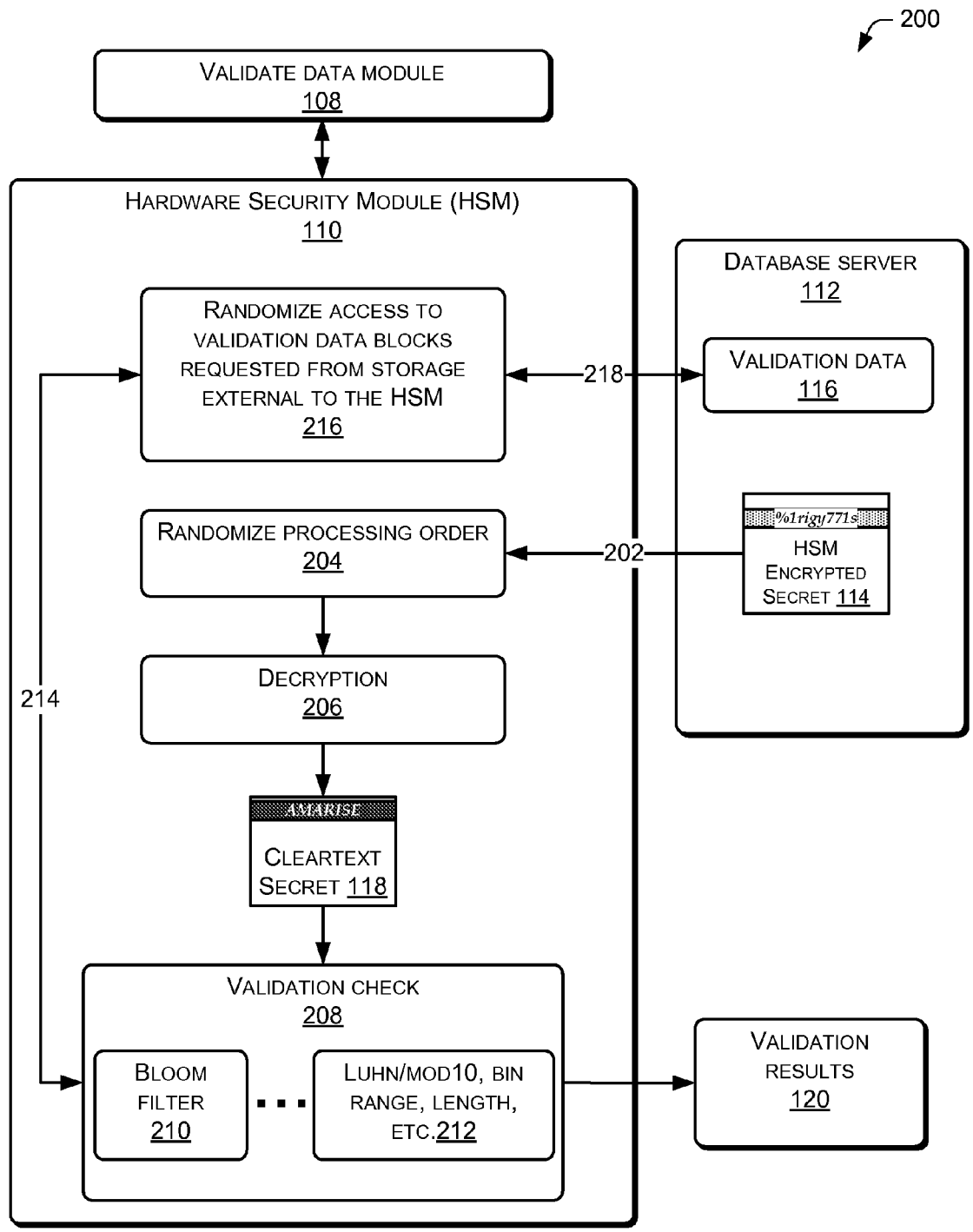
FIG. 2 is an illustrative schematic diagram of the HSM within the validation server of FIG. 1.

FIG. 2 is an illustrative schematic diagram 200 of the hardware security module within the validation server of FIG. 1.

A validate data module 108, upon request for data validation received from validation server 106, calls upon the HSM 110 to decrypt and validate the data. This validation may require access of information outside of the HSM 110 internal memory.

When fulfilling a validation request requiring data outside of the HSM, the HSM 110 may request 202 an HSM-encrypted secret 114 from database server 112. A determination of which HSM-encrypted secret to be accessed may be aided by the use of a previously issued token. A token is used to reference a particular piece of confidential data which may be encrypted or unencrypted, but the token itself is not itself necessarily encrypted. A token may contain no information other than that it is a referent. The token may have been previously issued as a result of operations within the HSM 110.

In some implementations, the return order of a plurality of requested HSM-encrypted secrets may be randomized 204. The return order is the sequence in which data is output from the HSM. "Randomizing" as used in this application includes any operation which results in an output sequence which differs from the original input. A hardware random number generator (HRNG) or pseudorandom number generator within the HSM may implement randomization. Randomizing the order of data returned by the HSM 110 increases the difficulty of associating a particular input to the HSM with a particular output from the HSM and compromising the confidential data or the system. This renders an attack on the data, based correlation of inputs and outputs, more difficult, thus hardening the system.

For example, payment processing server 102 send three requests A, B and C to the validation server for validation. Requests A, B and C are received and passed along to the HSM 110 for processing. Typically those requests may be processed in the order received (first in, first out), in this example A, B and C. However, randomization processing order module 204 may change the order of processing. In this example, requests may be processed in order C, A, B, thus affecting the order of the output returned. A return order randomization module may take validation results and randomize their order of output from the HSM. The return order randomization module may be used with, or instead of, the randomizing processing order module.

Within the HSM, a process identifier or other identifier is then used to retain the association between the cleartext secret 118 being processed and the validation data 116 being retrieved for validation.

HSM-encrypted secret 114 is decrypted by decryption module 206 within the HSM 110 producing cleartext secret 118. In this example, the cleartext string "AMARISE" is now present within the HSM 110 and available for validation checking.

Validation check module 208 accepts the cleartext and validates the data using a variety of business rule validation tools. In one implementation, a Bloom filter 210 may be used by the validation check module 208 to validate data against business rules. Other business rule validation checks 212 that may additionally or alternatively be used include a Luhn/mod 10 check, a BIN range check, checksum, a length check, and/or other relevant checks used to validate payment types including credit cards, debit cards, charge cards, stored-value cards, electronic benefit transfer cards, and the like. Checksums, comparison of strings, hashing algorithms, and the like may also be used to validate data. For example, a validation check may compare data to be validated with a list of valid data, or apply a hashing algorithm to the data to be validated and compare the resulting hash with a pre-determined value.

As described above, validation may require the use of validation data stored outside of the HSM. Because memory in an HSM 110 is generally smaller than that of a dedicated database server 112 (200 MB compared to terabytes, for example), requests to external data sources may occur. Thus, validate check module 208 may send a request 214 for validation data stored outside of the HSM 110. However, in other implementations, the HSM may include sufficient memory that requests to external data sources are not necessary.

A randomization access module 216 varies the sequence of data access by the HSM 110 to further obscure what data is being validated within the HSM 110. A request 218 for validation data 116 from the HSM 110 to database server 112 returns validation information to the HSM 110.

Certain acts in 200 need not be performed in the order described, may be modified and/or may be omitted entirely, depending on the circumstances. For example, only the randomization of processing order 204 may take place, or randomizing access to validation data blocks 216, or both, as described above.

Figure 3:
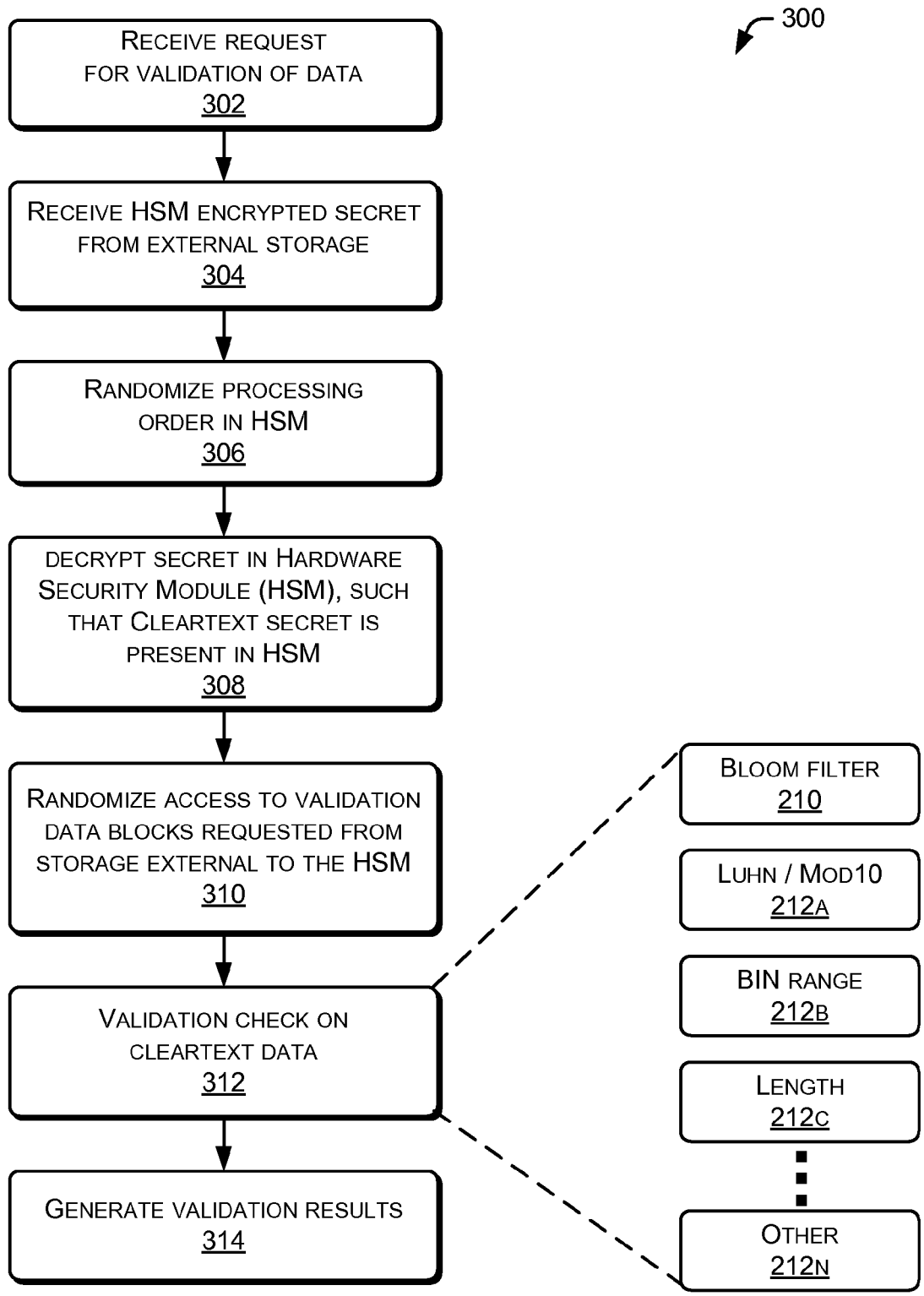
FIG. 3 is a flowchart of an illustrative method of validating data within an HSM, such as the HSM described in FIG. 2.

FIG. 3 is a flowchart of an illustrative method 300 of validating data within an HSM, as described in FIG. 2.

At 302, a request for validation of data 104 is received by a validate data module 108, which calls on functions in the HSM 110. At 304, an HSM-encrypted secret 114 is received from external storage in the database server 112.

At 306, the processing order of a plurality of HSM-encrypted secrets 114 is randomized. This randomization obscures the relationship between data being input into the HSM 110 and data being output from the HSM 110, to further harden security of the system.

At 308, the HSM 110 decrypts within the HSM 110 the HSM-encrypted secret 114 to produce cleartext 118.

At 310, the requested validation data blocks external to the HSM 110 which are necessary to validate the cleartext 118 are randomized. This randomization obscures the relationship between data being input into the HSM 110 and data being output from the HSM 110, to further harden security of the system. The requests are passed to the database server 112 which returns the requested validation data 116.

At 312, a validation check 208 on the cleartext 118 is performed. This validation data may utilize one or more of a variety of validation methods including, but not limited to, those described below.

At 210, a Bloom filter is shown for validation. A Bloom filter is a space-efficient probabilistic data structure used to test whether an element is a member of a set. Because of the space-efficient nature of the Bloom filter, the Bloom filter function and data structure may be stored entirely within the HSM memory to further safeguard data, with validation occurring within the HSM, and without reference to data external within the HSM. The HSM may also use a learning Bloom filter. A learning Bloom filter accepts known good data or defined exceptions, and builds a data structure for validation of unknown data to be validated.

At 212A, the Luhn or mod 10 credit card algorithm may be utilized.

At 212B, the Bank Identification Number (BIN) range may be checked for validity in the case of credit cards, debit cards, charge cards, stored-value cards, electronic benefit transfer cards, and the like.

At 212C, the length of a data to be validated may be checked, i.e., 16 digits required for a valid credit card number.

At 212N, other validation procedures may be used, including hash functions, string comparison, and so forth.

At 314, the validation results of validation check 312 are generated and may be output from the HSM.

Certain acts in method 300 need not be performed in the order described, may be modified and/or may be omitted entirely, depending on the circumstances. For example, the randomization of processing order 306 may occur before HSM-encrypted secrets are read 304. As another example, the validation check on cleartext data 312 may take place and then request data from external storage, which would then call on randomizing access to validation data blocks 310. Also, only the randomization of processing order 306 may take place, or randomizing access to validation data blocks 310, or both, as described above.

Figure 4:
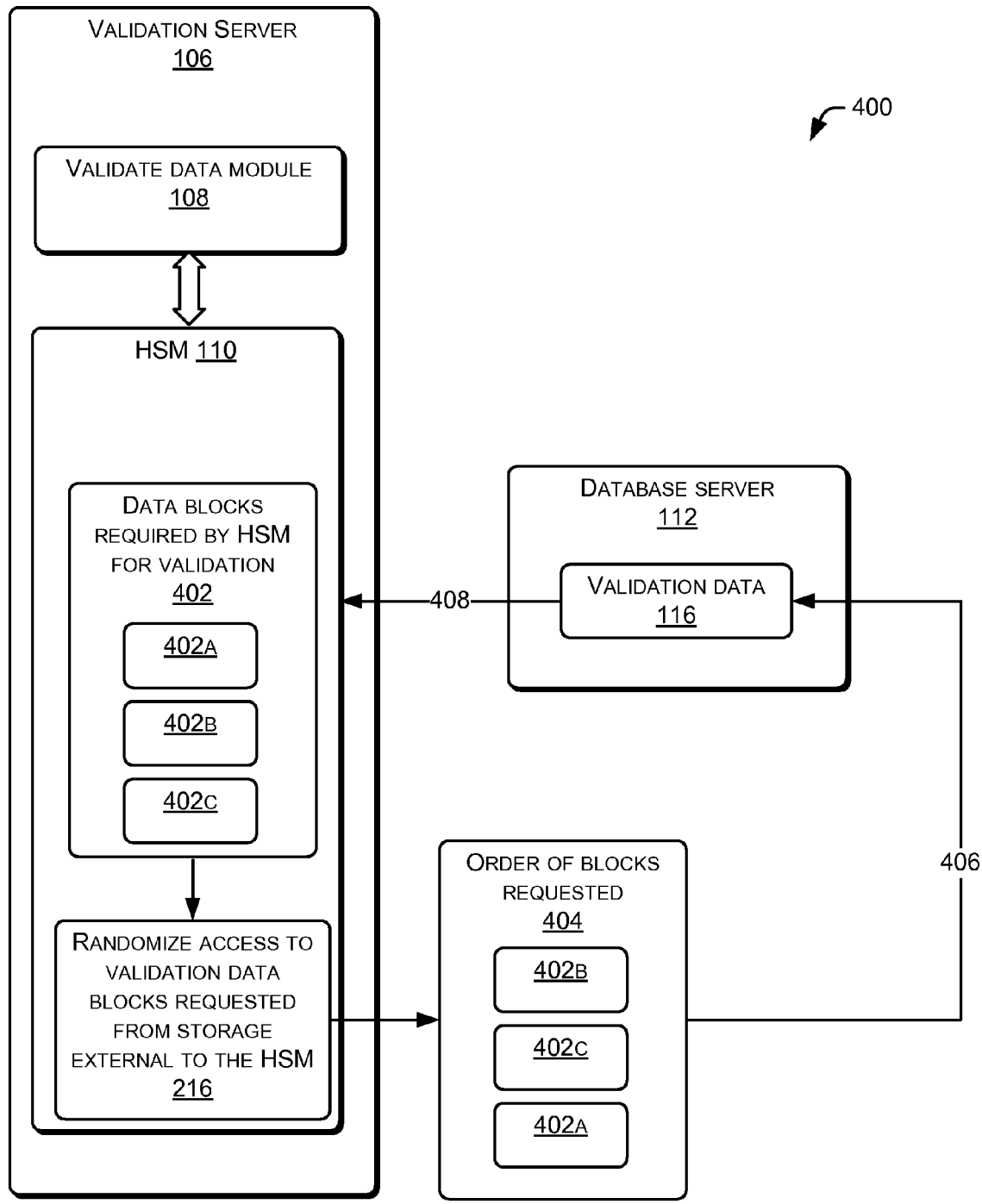
FIG. 4 is a schematic diagram of an illustrative method of randomizing validation data requested by the HSM and retrieved from a database.

FIG. 4 is a schematic diagram 400 of the randomization of validation data requested by the HSM and retrieved from a database.

The validation server 106 is shown encompassing validate data module 108. The validate data module 108 is coupled to the HSM 110.

Data blocks 402 are data blocks indicating what validation data 116 is necessary to complete validation 206 in the HSM 110. For example, data blocks 402 may include blocks 402A, 402B and 402C, listed in the sequence generated for processing.

A randomization access module 216 varies the sequence in which data is accessed by the HSM 110 to further obscure what information is being validated within the HSM 110. In this example, the randomization access module changes the order of blocks requested.

The order of data blocks requested is randomized 404, the randomized order now being 402B, 402C and 402A. Randomization may include varying the order of data blocks, inserting blocks for data not undergoing validation, or the like.

Randomized data block 404 request is sent 406 to the database server 112. The database server 112 returns the requested validation data 408 to the HSM 110.

Certain acts in method 400 need not be performed in the order described, may be modified and/or may be omitted entirely, depending on the circumstances. For example, the method 400 may feedback all or a portion of the order of requested blocks 404 into the randomization access module 216.

Moreover, any of the acts of any of the methods described herein may be implemented at least partially by a processor or other computing device based on instructions stored on one or more computer-readable media. Computer-readable media can be any available media that can be accessed by a processor. By way of example, and not limitation, computer-readable media may comprise volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the processor. Combinations of the any of the above should also be included within the scope of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method of validating encrypted payment information against business rules, the method comprising:
   receiving, at a hardware security module (HSM) comprising a dedicated cryptographic processor and dedicated memory within a tamper resistant physical package, a plurality of secrets from a first storage device external to the HSM, wherein the plurality of secrets includes a first secret comprising encrypted credit card payment information;

decrypting the first secret within the dedicated memory of the HSM to create cleartext payment information within the dedicated memory of the HSM;

transmitting a plurality of requests, wherein individual requests of the plurality of requests are transmitted to request validation data for validating a corresponding secret of the plurality of secrets, wherein an order of transmission of the plurality of requests is randomized, and wherein the plurality of requests comprises a first request requesting validation data for validating the first secret;

in response to transmitting the first request, receiving first validation data;

based on the first validation data, validating within the dedicated cryptographic processor the cleartext payment information within the dedicated memory of the HSM;

generating within the dedicated cryptographic processor validation results indicating whether the cleartext payment information is valid; and transferring the validation results to one of the first storage device or a second storage device external to the HSM.

2. The method of claim 1, further comprising randomizing a return order in the HSM of a plurality of encrypted data.

3. The method of claim 1, wherein the validating uses a Bloom filter stored at least in part within the dedicated memory of the HSM and executed within the dedicated cryptographic processor.

4. The method of claim 1, further comprising selecting specific portions of the first validation data to be retrieved and stored within the dedicated memory of the HSM for use during validation by the dedicated cryptographic processor.

5. A method comprising:

receiving a plurality of encrypted data at a hardware security module (HSM) comprising a tamper resistant physical package and a dedicated memory and dedicated processor therein, wherein the plurality of encrypted data is received in a first order such that a first encrypted data of the plurality of encrypted data is received prior to receiving a second encrypted data of the plurality of encrypted data; and processing the plurality of encrypted data in a second order that is different from the first order such that the first encrypted data is processed subsequent to processing the second encrypted data, wherein processing the plurality of encrypted data comprises:

decrypting the first encrypted data within the HSM with one or more encryption keys securely stored within the dedicated memory to create cleartext within the dedicated memory;

validating the cleartext in the dedicated memory with the dedicated processor within the HSM against business rules stored within the dedicated memory; and generating validation results and transmitting the validation results from the HSM.

6. The method of claim 5, wherein the validating includes utilizing a Bloom filter stored at least in part within the dedicated memory and configured to execute in the dedicated processor of the HSM.

7. The method of claim 5, further comprising randomizing a return order of a plurality of encrypted data received by the HSM.

8. The method of claim 5, wherein the second order of processing the plurality of encrypted data is determined randomly.

9. A system comprising:

a computer server having a processor and memory;

a dedicated processor within the server comprising dedicated memory and wherein the dedicated processor and the dedicated memory are disposed within a tamper resistant physical package;

a storage device external to the dedicated processor; and a program executing on the dedicated processor configured to decrypt encrypted data to create first cleartext within the dedicated memory, access a plurality of validation data blocks to validate a corresponding plurality of cleartext, wherein the plurality of cleartext comprises the first cleartext, wherein the plurality of validation data blocks comprises a first validation data block to validate the first cleartext, and wherein an order in which the plurality of validation data blocks is accessed is randomized, and using the first validation data block, validate the first cleartext within the dedicated memory against business rules, and generate validation results for storage on the storage device external to the dedicated processor.

10. The system of claim 9, wherein the validating is configured to utilize a Bloom filter stored at least in part within the dedicated memory.

11. The system of claim 10, wherein the Bloom filter is configured to execute on the dedicated processor and the Bloom filter data is stored in the dedicated memory.

12. The system of claim 9, wherein the validating is configured to utilize a learning Bloom filter executed upon the dedicated processor.

13. The system of claim 9, wherein the program is configured to randomize a return order of a plurality of encrypted data.

14. The system of claim 9, wherein the program is configured to select only specific portions of validation data block to be retrieved by the dedicated processor from the storage device external to the dedicated processor.

15. A system comprising:

a tamper resistant physical package;

a computer with a dedicated processor and a dedicated memory within the tamper resistant physical package configured to execute cryptographic, communication, and input/output functions;

a storage device external to the tamper resistant physical package and coupled to the dedicated processor; and a program stored on the dedicated memory and configured to execute on the dedicated processor to:

receive encrypted data, decrypt the encrypted data into first cleartext, access a plurality of validation data blocks to validate a corresponding plurality of cleartext, wherein an order in which the plurality of validation data blocks is accessed is randomized, wherein the plurality of cleartext comprises the first cleartext, and wherein the plurality of validation data blocks comprises a first validation data block to validate the first cleartext, and based on accessing the first validation data block, validate the first cleartext on the dedicated processor, and output one or more validation results.

16. The system of claim 15, wherein the validating utilizes a Bloom filter.

17. The system of claim 15, wherein the program is configured to randomize a return order of a plurality of encrypted data.

18. The system of claim 15, wherein the program is configured to select only specific portions of validation data to be retrieved from the storage device.

19. One or more computer-readable storage media comprising instructions that when executed by a computer system cause the computer system to:
- receive a secret into a hardware security module (HSM), the HSM comprising a processor, a dedicated memory, and tamper resistant physical packaging;
- decrypt the secret within the dedicated memory of the HSM to create cleartext; and
- validate the cleartext within the processor of the HSM using business rules.

20. The computer-readable storage media of claim 19, wherein the validation utilizes a Bloom filter.

* * * * *